May 2, 1933.  B. H. URSCHEL  1,906,290
TUBULAR BEARING SUPPORTING STRUCTURE
Filed Aug. 23, 1930

Inventor
Bertis H. Urschel
By Faust F. Crampton
Attorney

Patented May 2, 1933

1,906,290

UNITED STATES PATENT OFFICE

BERTIS H. URSCHEL, OF BOWLING GREEN, OHIO, ASSIGNOR TO URSCHEL ENGINEERING COMPANY, OF TOLEDO, OHIO, A CORPORATION OF OHIO

TUBULAR BEARING SUPPORTING STRUCTURE

Application filed August 26, 1930. Serial No. 477,815.

My invention has for its object to provide a tubular structure that is particularly advantageous for withstanding stresses and strains that are transmitted between the points of interconnection of the structure in mechanisms of different forms. The invention particularly relates to those portions of the tubular structure that are connected to parts of the mechanism in connection with which the structure is used and through which the stresses occurring in the use of the mechanism are transmitted, the object of the invention being particularly to so shape the said portions that they will efficiently withstand tension and compression strains as well as shearing and torque stresses.

The invention is particularly advantageous in its application to tubular axles having stub axle bearing parts and load-carrying parts to which the vehicle is connected either through springs or brackets or other suitable means. The invention particularly relates to a saddle construction for interconnecting the axle to the body of the vehicle.

The invention may be used in structures of different forms and, to illustrate a practical application of the invention, I have selected axles having different forms of load-carrying or stress transmitting parts as examples of various embodiments of my invention, and shall describe the structures selected hereinafter, it being understood that variations therefrom may be made and that certain features of my invention may be used to advantage without a corresponding use of other features, without departing from the spirit of the invention. The particular structures selected are shown in the accompanying drawing.

Figure 2:
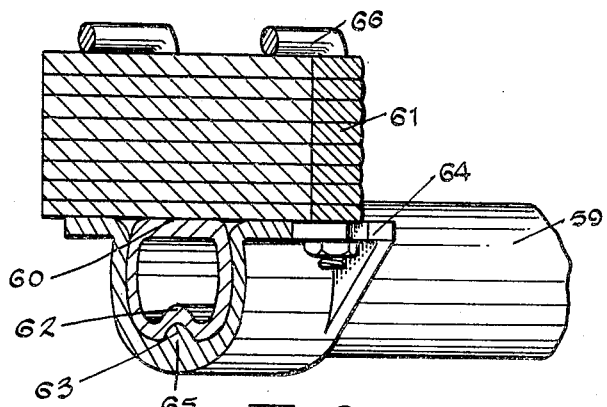
Figure 1:
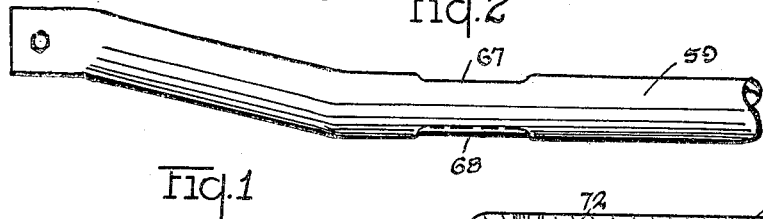
Figure 4:
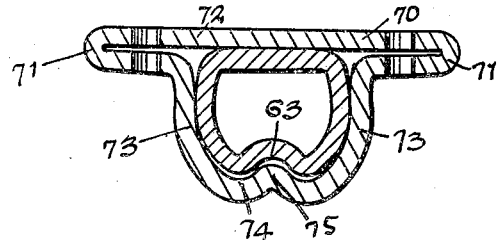
Figures 3, 5:
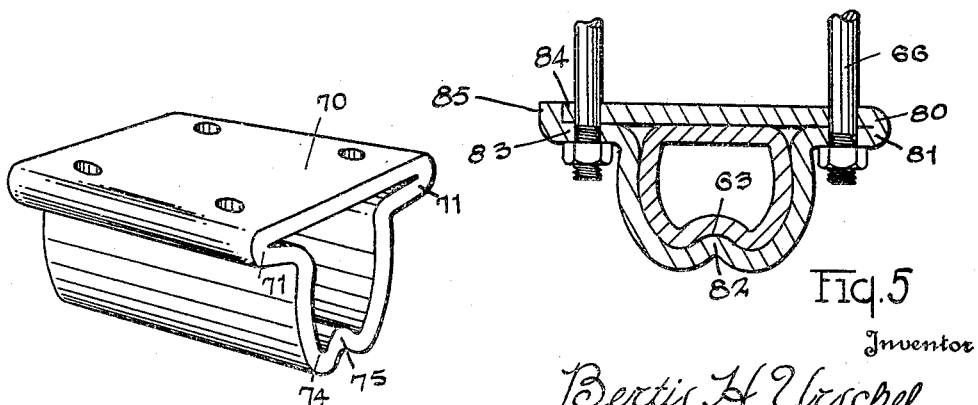

Fig. 1 illustrates a side view of a tubular axle for automobiles. Fig. 2 illustrates the formation of the part of the axle to which the springs of the vehicle are connected and also one form of a clamping member that coacts with the said part of the axle to efficiently secure the vehicle and axle to each other. Fig. 3 is a perspective view of a spring saddle that may be formed from a short tube. Fig. 4 is a view of a section of the saddle shown in Fig. 3 and of the axle. Fig. 5 illustrates a modification of the saddle shown in Figs. 2 and 3 when secured in position on the axle.

In the formation of the mechanical elements, embodying my invention, steel tubing, having a thin wall compared to its diameter, is used, such as, for axles, two and a half to three and a half inches in diameter, and a wall thickness of one-eighth or three-sixteenths of an inch. Preferably, seamless steel tubing is used. The parts of the tube may be upset and thickened and, if desired, it may be enlarged in its external dimensions to increase its resistance to the stresses and strains to which it is subjected.

Axles containing my invention have end portions so formed as to not only efficiently connect the stub axles, but also so as to efficiently connect the axles to the vehicle that is supported by the stub axles. The parts of the axle connected to the vehicle must withstand the stresses and strains that the stub axles are subjected to. In addition, the parts of the axle to which the vehicle is connected must withstand the torque and at the same time the shearing stresses due to the load carried by the axle. The steel tube is, preferably, flattened at two central portions of the axle, namely, at the points where the axle 59 is to be connected to the parts of the vehicle. The upper portions of these parts of the axle are formed to have substantially plane surfaces, as at 60, on which a spring supporting saddle is located, or, on which the springs 61 may be placed. The lower side 62 of the axle is indented, as at 63. The indentation 63, extending lengthwise of the axle, has a length that is slightly greater than the width of the springs 61.

The clamp 64 is provided with a ridge 65 that fits the indentation 63. The springs 61, the axle and the clamps 64, are drawn tightly together by means of the U-bolts, or clips, 66, which will tightly secure the axle against rotation by reason of the plane surface of the flattened portion 60, the indentation 63, to prevent longitudinal movement of the axle by reason of the recessed areas 67 and 68 produced by flattening the portions of the upper surface of the axle to form the plane surfaces 60 and the drawing in of the metal of the lower side of the axle to form the indentations 63.

If desired, the axle 59 may be provided with a saddle of the form shown in Figs. 3 and 4, or of the form shown in Fig. 5. The saddle 70 is, preferably, formed of a steel tube of relatively large diameter which is shaped to form the flange portions 71, the plane portion 72, that rests on the substantially plane surface 60 of the upper side of the axle, the remainder of the metal of the saddle being made to conform to the shape of the surface of the remainder of that part of the axle to which the vehicle is connected, that is, the metal of the saddle 70 conforms to the lateral portions of the said part of the axle, as at 73, and with the lower side of the axle, as at 74, and so as to penetrate the recess 63 of the lower side of the axle, the metal of the saddle being provided with a ridge 75 that engages in the recess 63. Preferably the flange parts are formed of looped portions of the metal of the saddle having side parts that are spaced from each other and so that when they are drawn together by means of bolts, the lower part of the metal of the saddle will tightly clamp and secure the saddle to the axle. This will operate to maintain the tension on the heads and nuts of the clamping bolts and prevent their rotation that might otherwise occur by the jarring and vibration to which this part of the axle is subjected. The springs are secured by means of U-bolts or clips, such as the U-bolts 66, to the saddles and to draw the lower parts of the saddles against the lower side of the parts of the axle to which the vehicle is connected.

The saddle may also be made of a flat or sheet metal stock and bent to conform substantially to the shape illustrated in Figs. 3 and 4. This form of construction is shown in Fig. 5, wherein the said material having a length slightly longer than the width of the springs is bent along a line, as at 80, to form the flange 81. The remainder of the plate is bent to conform substantially to the shape of the lower sides of the part of the axle to which the vehicle is connected following substantially the configuration of the saddle shown in Fig. 4, it being provided with a ridge part 82 that is adapted to enter the recess 63. The end edge of the flat metal is bent laterally, as at 83, to form the flange part 84, and also the end edge of the metal is bent upwardly, as at 85, to cover the other end edge of the metal. The portions of the flat metal that form the flanges 81 and 84 are so formed that parts thereof are separated by short distances in the same manner that the looped portions of the flanges 71, of the form of construction shown in Fig. 4, are separated and the lower portion of the saddle is also so shaped that drawing of the parts of the flanges of the saddle will draw the lower portion of the saddle into conformation and into contact with the lower portions of that part of the axle to which the saddle is connected in the same manner that the lower portions of the saddle, shown in Figs. 3 and 4, are drawn into contact and clamping relation with the axle. The springs are clamped to the saddles and the axle is secured to the saddle by means of the U-bolts, such as the U-bolts 66, whereby the springs and saddles will be held in position and longitudinal displacement of either the axle or the springs and the rotation of the axle will be prevented by the recesses formed in the axle and the correspondingly shaped portions of the saddle.

If desired, the saddles may be roughly formed and so as to have interior dimensions such as to enable them to slip over either end of the axle and in advance of forming the flattened surface 60 and the indented or recessed part 63. When the saddles are placed in position on the axle, the saddles may be completely formed substantially as shown in Figs. 4 and 5, while at the same time the flattened portions of the axle and the recessed portion 63 are formed. This may be done by a suitable press, whereby the formation of the saddle will be completed to produce the top flat portion 70, the conforming lateral side 73, and the ridged portion 75.

I claim:

1. In a tubular axle for a vehicle, the tubular axle having a flattened surface portion in its upper side and a re-entrant portion in its lower side forming a pair of ridges, a clamping member having a ridge protruding into the re-entrant portion and means for connecting the clamping member to the springs of the vehicle.

2. In a tubular axle for vehicles, the tubular axle having flattened central portions in its upper surface, and recessed portions in its lower surface, saddles, each of the saddles having a plane inner surface conforming to the flattened portion of the axle, and an inwardly extending ridge conforming to the recess of the lower side of the axle and laterally extending flanges forming loops having opposed surfaces that are normally spaced from each other, and bolts for connecting the saddles to the springs of the vehicle for clamping the axle between the upper and lower portions of the saddles and connecting the axle to the springs of the vehicle.

3. In combination with an axle for vehicles, saddles, each of the saddles having laterally extending flanges forming loops having opposed surfaces that are normally spaced from each other, and having inner lateral surfaces, and a bottom surface substantially fitting the lateral surfaces and the bottom surface of the axle, and bolts for connecting the saddles to the vehicles for clamping the axle between the upper and lower portions of the saddles and connecting the axle to the vehicle.

4. In a tubular axle for a vehicle, a tubular single clamping member extending longitudinally along and around the axle for re-enforcing the axle, and having flange portions extending laterally, and means for clamping the clamping member to the tubular axle and securing the clamping member to the springs of the vehicle.

5. In a tubular axle for a vehicle, a tubular single clamping member extending longitudinally along and around the axle and formed of a single piece and having flange portions extending laterally, one of said portions forming a continuous loop, and means for clamping the clamping member to the axle and securing the clamping member to the springs of the vehicle.

6. In a tubular axle for a vehicle, a tubular clamping member extending longitudinally along and around the axle and formed of a single integral member, and having flange portions extending laterally, one of the laterally extending portions forming a continuous loop and means for drawing the sides of the loop together to clamp the clamping member to the tubular axle and for securing the clamping member to the springs of the vehicle.

7. In a tubular axle for a vehicle, a tubular clamping member extending longitudinally along and around the axle and formed of a single member, the axle having a re-entrant portion in its lower side and the clamping member having a ridge protruding into the re-entrant portion, and means for clamping the member to the axle.

8. In a tubular axle for a vehicle, a tubular clamping member extending longitudinally along and around the axle and formed of a single member, the axle having a re-entrant portion in its lower side and the clamping member having a ridge protruding into the re-entrant portion, the clamping member having laterally extending flange portions, one of the said flange portions forming a continuous loop, and means for drawing opposite sides of the flange portions towards each other to clamp the clamping member to the axle.

9. In a tubular axle for a vehicle, a tubular clamping member, the clamping member having laterally extending flanges forming loops, means for drawing together the opposing surfaces of the said loops for clamping the clamping member to the axle.

10. In a tubular axle for a vehicle, a tubular clamping member, the clamping member having laterally extending flanges forming loops, the axle having a re-entrant portion on one side and the clamping member having a ridge located in the re-entrant portion and means for drawing the opposing surfaces of the loops of the flanges towards each other to clamp the clamping member to the axle.

In witness whereof I have hereunto signed my name to this specification.

BERTIS H. URSCHEL.